(12) United States Patent
Park et al.

(10) Patent No.: US 11,024,994 B2
(45) Date of Patent: Jun. 1, 2021

(54) CONNECTOR DEVICE HAVING MULTI-RECEIVING PART

(71) Applicant: SAMSUNG ELECTRONICS CO., LTD., Suwon-si (KR)

(72) Inventors: Sangil Park, Seoul (KR); Gwanghui Lee, Gumi (KR); Jinchul Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 483 days.

(21) Appl. No.: 16/072,259

(22) PCT Filed: Feb. 23, 2017

(86) PCT No.: PCT/KR2017/002024
§ 371 (c)(1),
(2) Date: Jul. 24, 2018

(87) PCT Pub. No.: WO2017/150844
PCT Pub. Date: Sep. 8, 2017

(65) Prior Publication Data
US 2021/0091492 A1    Mar. 25, 2021

(30) Foreign Application Priority Data
Mar. 3, 2016 (KR) .......................... 10-2016-0025720

(51) Int. Cl.
*H01R 12/72* (2011.01)
*H01R 12/58* (2011.01)
(Continued)

(52) U.S. Cl.
CPC .......... *H01R 12/721* (2013.01); *G06F 1/186* (2013.01); *G06K 13/08* (2013.01); *H01R 12/585* (2013.01)

(58) Field of Classification Search
CPC ...... H01R 12/721; H01R 12/72; H01R 12/71; H01R 12/70; H01R 13/08; G06F 1/186; G06F 1/183; G06F 1/08
(Continued)

(56) References Cited

U.S. PATENT DOCUMENTS 6,471,550 B2 * 10/2002 Maiterth ............. G06K 7/0021
439/326
6,863,571 B2 * 3/2005 Sato ..................... G06K 7/0004
439/630
(Continued)

FOREIGN PATENT DOCUMENTS

KR   10-2010-0105748   9/2010
KR   10-2012-0068997   6/2012
(Continued)

OTHER PUBLICATIONS

International Search Report for PCT/KR2017/002024, dated Apr. 28, 2017, 4 pages.
(Continued)

*Primary Examiner* — Harshad C Patel
(74) *Attorney, Agent, or Firm* — Nixon & Vanderhye, P.C.

(57) ABSTRACT

Various examples of the present invention relate to a connector device having a multi-receiving part, the connector device enabling a SIM card and an SD card having different sizes to be individually or simultaneously mounted by using one tray, thereby increasing the spatial usability of an electronic device, having advantages in terms of outline design, saving manufacturing costs, and increasing the usability of the electronic device. Various examples, in addition to the examples disclosed in the present invention, are possible.

15 Claims, 9 Drawing Sheets

(51) Int. Cl.
*G06F 1/18* (2006.01)
*G06K 13/08* (2006.01)

(58) Field of Classification Search
USPC ....... 439/637, 638, 628, 629, 631, 632, 633, 439/635
See application file for complete search history.

(56) References Cited

U.S. PATENT DOCUMENTS

| | | | | |
|---|---|---|---|---|
| 7,044,757 | B1* | 5/2006 | Yen | G06K 19/07739 439/138 |
| 7,377,815 | B2* | 5/2008 | Takao | H05K 5/026 361/737 |
| 7,429,196 | B2* | 9/2008 | Takei | H01R 27/02 439/541.5 |
| 7,833,063 | B2* | 11/2010 | Matsumoto | G06K 7/0021 439/630 |
| 7,833,064 | B1* | 11/2010 | Lai | H01R 27/00 439/630 |
| 7,878,858 | B1* | 2/2011 | Tung | G06K 7/0021 439/630 |
| 8,038,477 | B2* | 10/2011 | Zhang | G06K 13/0806 439/630 |
| 8,568,174 | B2* | 10/2013 | Liu | H01R 27/02 439/630 |
| 8,597,057 | B2* | 12/2013 | Yu | H01R 13/635 439/630 |
| 9,048,594 | B2* | 6/2015 | Lim | H01R 12/71 |
| 9,209,538 | B2* | 12/2015 | Yoshida | H01R 12/714 |
| 9,214,772 | B2* | 12/2015 | Liu | H01R 12/721 |
| 9,373,060 | B2* | 6/2016 | Zhang | G06K 13/0831 |
| 9,647,359 | B2* | 5/2017 | Cho | H01R 12/7076 |
| 9,711,881 | B2* | 7/2017 | Xu | G06K 13/08 |
| 2004/0161976 | A1 | 8/2004 | Lee | |
| 2007/0218770 | A1* | 9/2007 | Kikuchi | H01R 27/00 439/630 |
| 2011/0003513 | A1 | 1/2011 | Matsumoto et al. | |
| 2013/0225003 | A1* | 8/2013 | Liu | H01R 27/02 439/629 |
| 2014/0113495 | A1 | 4/2014 | Lim et al. | |
| 2014/0250481 | A1* | 9/2014 | Dewa | H04H 20/91 725/115 |
| 2015/0011118 | A1 | 1/2015 | Matsunaga | |
| 2015/0079847 | A1 | 3/2015 | Liu et al. | |
| 2015/0333444 | A1* | 11/2015 | Wang | H01R 12/72 439/159 |
| 2017/0194728 | A1* | 7/2017 | Yang | H01R 12/721 |
| 2017/0250481 | A1* | 8/2017 | Zhu | H01R 13/635 |

FOREIGN PATENT DOCUMENTS

| | | |
|---|---|---|
| KR | 10-2013-0094969 | 8/2013 |
| KR | 10-2015-0004262 | 1/2015 |
| KR | 10-1489490 | 2/2015 |
| KR | 10-2015-0022775 | 3/2015 |
| KR | 10-1586252 | 1/2016 |

OTHER PUBLICATIONS

Written Opinion of the Isa for PCT/KR2017/002024, dated Apr. 28, 2017, 6 pages.

* cited by examiner

CONNECTOR DEVICE HAVING MULTI-RECEIVING PART

This application is the U.S. national phase of International Application No. PCT/KR2017/002024 filed 23 Feb. 2017, which designated the U.S. and claims priority to KR Patent Application No. 10-2016-0025720 filed 3 Mar. 2016, the entire contents of each of which are hereby incorporated by reference.

TECHNICAL FIELD

The disclosure relates to a connector device having a multi-receiving part in which a Subscriber Identification Module (SIM) card and a Secure Digital (SD) card can be individually or simultaneously seated.

BACKGROUND ART

In general, electronic devices such as a smartphone have a SIM card keeping information for identifying a subscriber.

Since a SIM card keeps subscriber identification information, it is possible to not only insert and use the SIM card in another electronic device, but use the electronic device conveniently without specific authentication in electronic commerce.

Furthermore, electronic devices such as a smartphone, a Personal Digital Assistant (PDA), a notebook, and a digital camera are equipped with an SD card to expand their storage space.

Memory cards used for these electronic devices, such as a SIM card or an SD card, are seated in trays and the trays can be inserted and drawn out through sockets in the electronic devices.

DISCLOSURE OF INVENTION

Technical Problem

Electronic devices of the related art are configured such that a SIM card and a SD card are put in respective trays arranged in parallel with each other and then inserted or drawn out through sockets of the electronic devices.

Accordingly, the electronic devices of the related art have poor spatial usability and are disadvantageous in terms of design of the external appearance, and the manufacturing costs are increased.

Further, electronic devices of the related art have a structure being able to have and use any one of a SIM card and an SD card, so there is a structural limit that a SIM card and an SD card cannot be simultaneously used.

Various embodiments of the disclosure can provide a connector device having a multi-receiving part that allows for individually or simultaneously keeping and using a SIM card and an SD card for electronic devices.

Solution to Problem

In accordance with an aspect of the disclosure, there is provided a connector device having a multi-receiving part, the connector device including: a tray having an opening therein and having a first wall, a second wall, a third wall, and a fourth wall that are integrally combined to receive a first memory card and/or a second memory card; and plate springs disposed respectively inside of the first wall and the second wall of the tray and fixing the first memory card seated in the tray, in which first seats horizontally extending are formed at predetermined positions on the inner sides of the first wall and the second wall of the tray to seat the first memory card, and second seats horizontally extending are formed at predetermined positions on the inner sides of the first wall, the second wall, and the third wall to seat the second memory card over the first memory card.

Furthermore, in accordance with another aspect of the disclosure, there is provided an electronic device including the connector device.

Advantageous Effects of Invention

According to various embodiments, it is possible to mount and use a SIM card and an SD card for an electronic device individually or simultaneously in one tray.

According to various embodiments, it is possible to receive individually or simultaneously a SIM card and an SD card, which are different in size, in one tray, whereby it is possible to increase spatial usability of an electronic device, provides advantages in terms of design of external appearance, reduce the manufacturing costs, and increase usability of an electronic device.

BEST MODE FOR CARRYING OUT THE INVENTION

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments.

In describing the drawings, similar reference numerals may be used to designate similar constituent elements. A singular expression may include a plural expression unless they are definitely different in a context.

As used herein, the expression "have", "may have", "include", or "may include" refers to the existence of a corresponding feature (e.g., numeral, function, operation, or constituent element such as component), and does not exclude one or more additional features.

As used herein, singular forms may include plural forms as well unless the context clearly indicates otherwise. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. For example, a first electronic device and a second electronic device may indicate different user devices regardless of order or importance thereof. For example, a first element may be termed a second element, and similarly, a second element may be termed a first element without departing from the scope of the present disclosure.

When an element (e.g., first element) is referred to as being "(functionally or communicatively) connected," or "directly coupled" to another element (second element), the element may be connected directly to the another element or connected to the another element through yet another element (e.g., third element). In contrast, it may be understood that when an element (e.g., first element) is referred to as being "directly connected," or "directly coupled" to another element (second element), there are no element (e.g., third element) interposed between them.

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to".

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, terms defined in this specification may not be interpreted as excluding embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, various embodiments of the present disclosure will be described with reference to the accompanying drawings. In the present disclosure, the term "user" may refer to a person using an electronic device or a device (for example, an artificial intelligence electronic device) using an electronic device.

Figure 5:
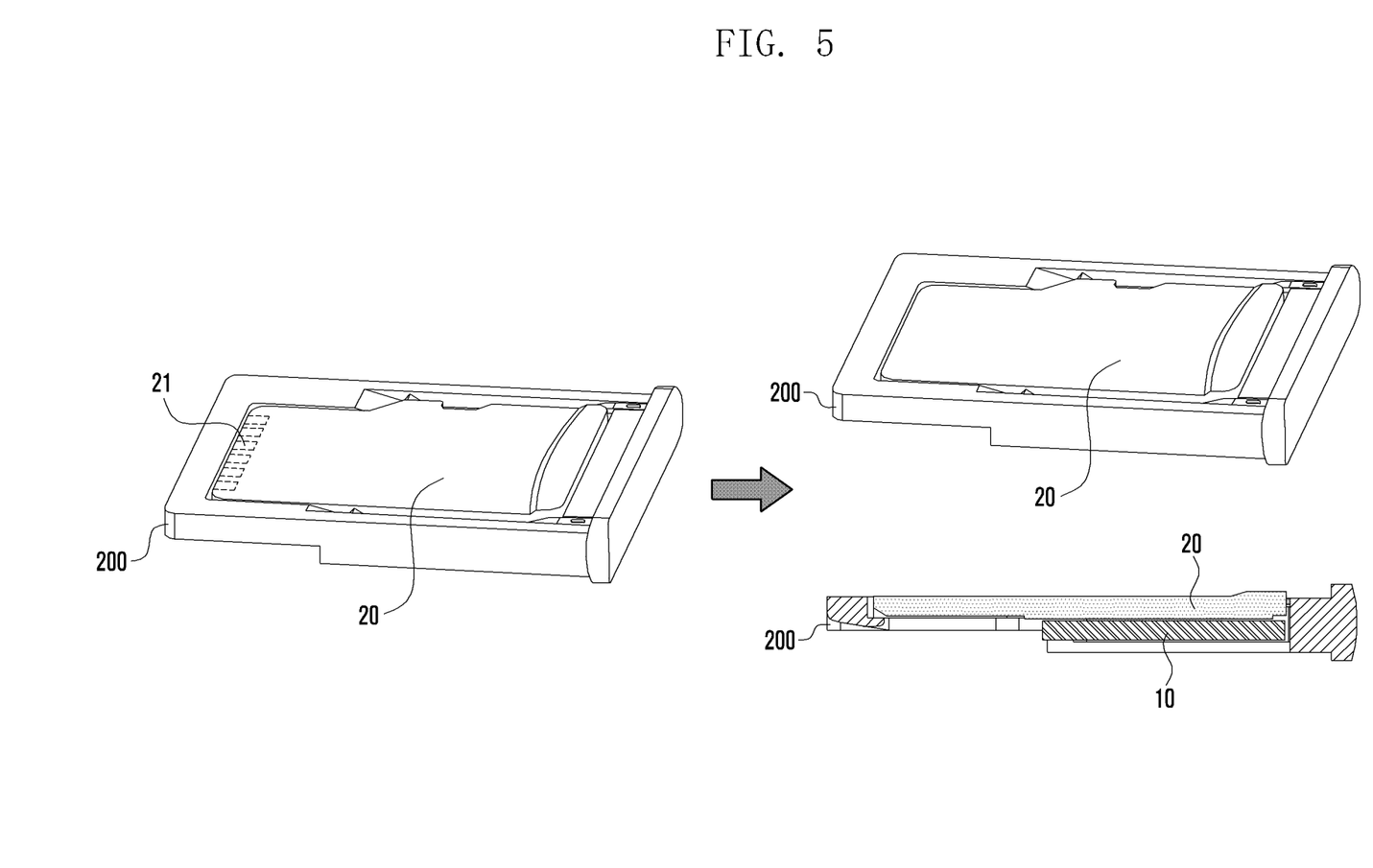
FIGS. 5 and 6 are views illustrating a process of seating an SD card in a tray in accordance with various embodiment.
Figure 6:
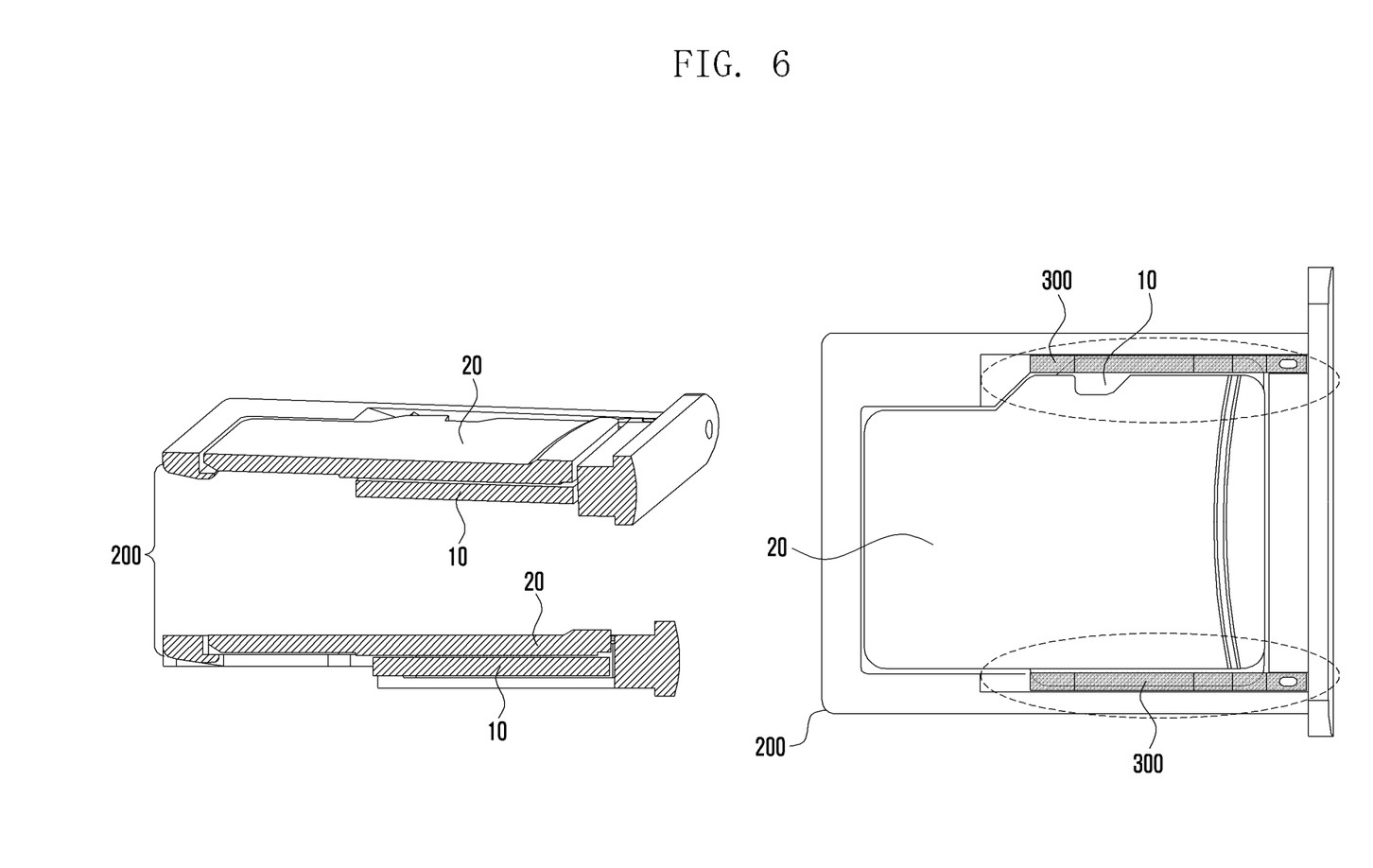

A tray 200 according to various embodiments may have a rectangular shape having an opening 201, which is an internal empty space, a four walls. The tray 200 may have a first wall 210, a second wall 220, a third wall 230, and a fourth wall 240 that are integrally combined. The fourth wall 240 may be separately formed by insert injection molding and then integrally combined with the first wall 210, the second wall 220, and the third wall 230. The first wall 210 and the second wall 220 may face each other and the third wall 230 and the fourth wall 240 may face each other. The tray 200, as shown in FIGS. 5 and 6, can be inserted into and drawing out of an electronic device (not shown) with a SIM card 10 that is a first memory card and an SD card 20 that is a second memory card seated therein. The fourth wall 240 can function as a cover that is a portion of the external appearance of the tray 200. The tray 200 may be manufactured by forming an insulating material such as synthetic resin.

According to various embodiments, a 1-1 extension 211 may be formed downward at a predetermined position on the first wall 210. The 1-1 extension 211 extends toward the fourth wall 240 from a substantially middle point of the first wall 210 and may be integrally formed with the fourth wall 240. A 2-1 extension 221 may be formed downward at a predetermined position on the second wall 220. The 2-1 extension 221 extends toward the fourth wall 240 from a substantially middle point of the second wall 220 and may be integrally formed with the fourth wall 240.

According to various embodiments, first extensions 213 horizontally extending inward to be able to support the SIM card 10 may be formed on the 1-1 extension 211 and the 2-1 extension 221. Second seats 223 horizontally extending to be able support the SIM card 20 may be formed at predetermined positions on the first wall 210, the second wall 220, and the third wall 230.

According to various embodiments, the first seats 213 and the second seats 223 may be positioned at different height due to steps 215 formed at the joints therebetween. That is, the first seats 213 are formed on the 1-1 extension 211 extending toward the fourth wall 240 from the substantially middle point on the first wall 210 and on the 2-1 extension 221 extending toward the fourth wall 240 from the substantially middle point on the second wall 220, and the second seats 223 are formed toward the third wall 230 from the substantially middle points on the first wall 210 and the second wall 220. Accordingly, the first seats 213 can be positioned lower than the second seats 223.

According to various embodiments, portions, which go to the third wall 230 from a substantially middle point on the tray 200, of the first wall 210 and the second wall 220 may be thicker than portions, which go to the fourth wall 240 from the substantially middle point on the tray 200, of the first wall 210 and the second wall 220. Accordingly, the width between the first wall 210 and the second wall 220 at the portions going to the third wall 230 from the substantially middle point on the tray 200 can be smaller than the width at the portions going to the fourth wall 240 from the substantially middle point on the tray 200 between the first wall 210 and the second wall 220. Chamfered surfaces 224 may be formed toward the steps 215 at predetermined positions from the substantially middle point on the tray 200, on the second seats 223 formed inside the first wall 210 and the second wall 220. The chamfered surfaces 224 may have shapes corresponding to cut-off portions formed at a portion of the SIM card 10 or the SD card 20.

According to various embodiments, slopes 225 inclined down toward the first seats 213 may be formed on the tops of the middle portions of the first wall 210 and the second wall 220 so that the SIM card 10 can be easily slid to be seated on the first seats 213. That is, the slopes 225 may be inclined up toward the top of the third wall 230 from the tops of the steps 215 formed at ends of the first seats 213.

According to various embodiments, plate springs 300 each may have a first section 310, a pressing section 315, and a second section 320 that are integrally combined. The plate springs 300 can fix the SIM card 10 seated on the first seats 213. The plate springs 300 may be disposed inside the first wall 210 and the second wall 200.

According to various embodiments, the first sections 310 of the plate springs 300 disposed inside the first wall 210 and the second wall 220 of the tray 200 can be fixed at predetermined positions inside the fourth wall 240 of the tray 200 in various ways, for example, by riveting, welding, and fitting.

According to various embodiments, the pressing sections 315 of the plate springs 300 are integrally connected with the first sections 310 and extended horizontally from predetermined points, thereby being able to press and fix the SIM card 10 when the SIM card 10 is seated on the first seats 213.

According to various embodiments, the second sections 320 of the plate springs 300 may be formed to be inclined upward around the slopes 225 formed on the tops of the middle portions of the first wall 210 and the second wall 220 of the tray 200. The angles of the slopes 225 are smaller than the angles of the second sections 320 of the plate springs 300, so gaps 301 can be formed between the slopes 225 and the second sections 320 of the plate springs 300.

Figure 1:
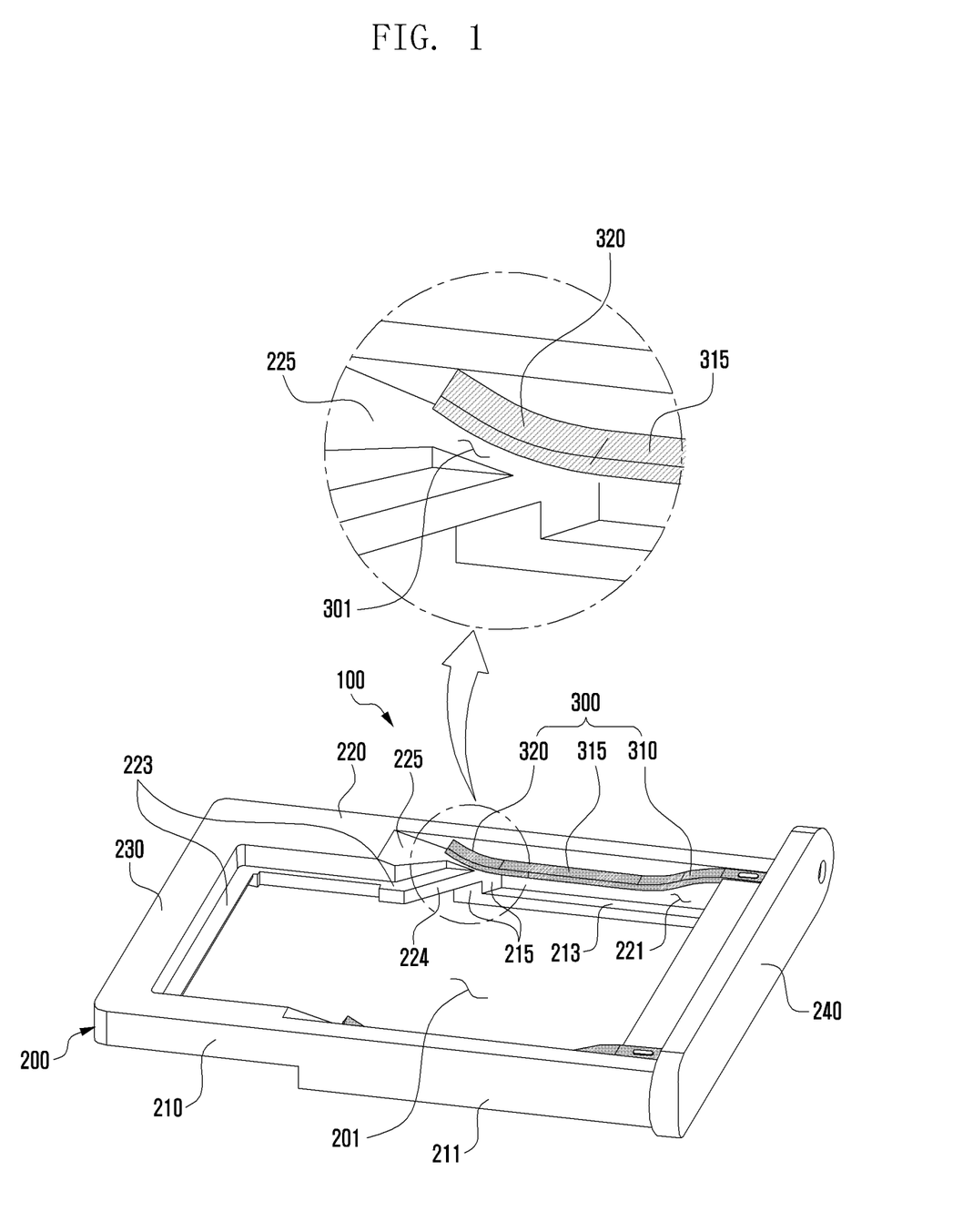
FIG. 1 is a view showing a first connector device having a multi-receiving part according to various embodiments.
Figure 2:
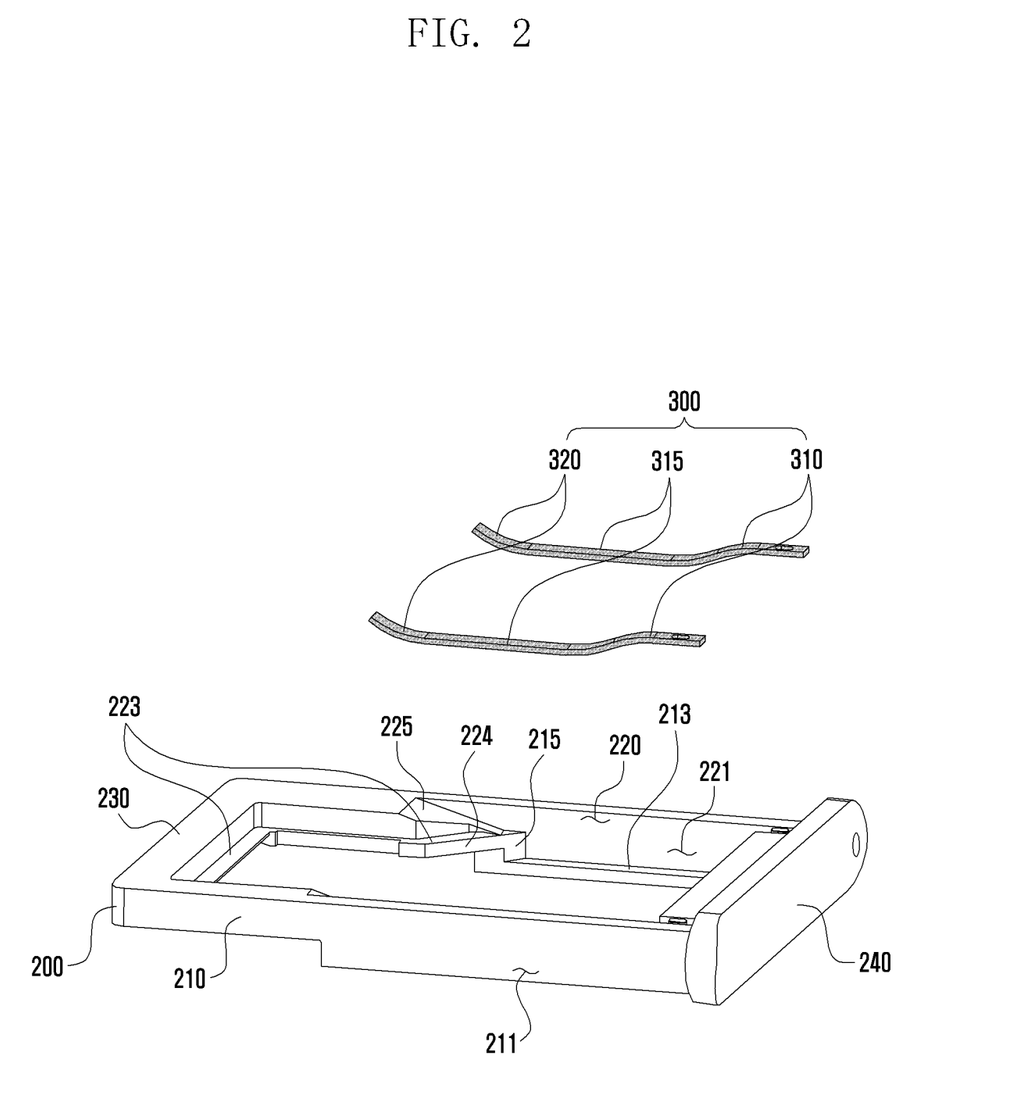
FIG. 2 is an exploded perspective view showing the first connector device having a multi-receiving part according to various embodiments.
Figure 3:
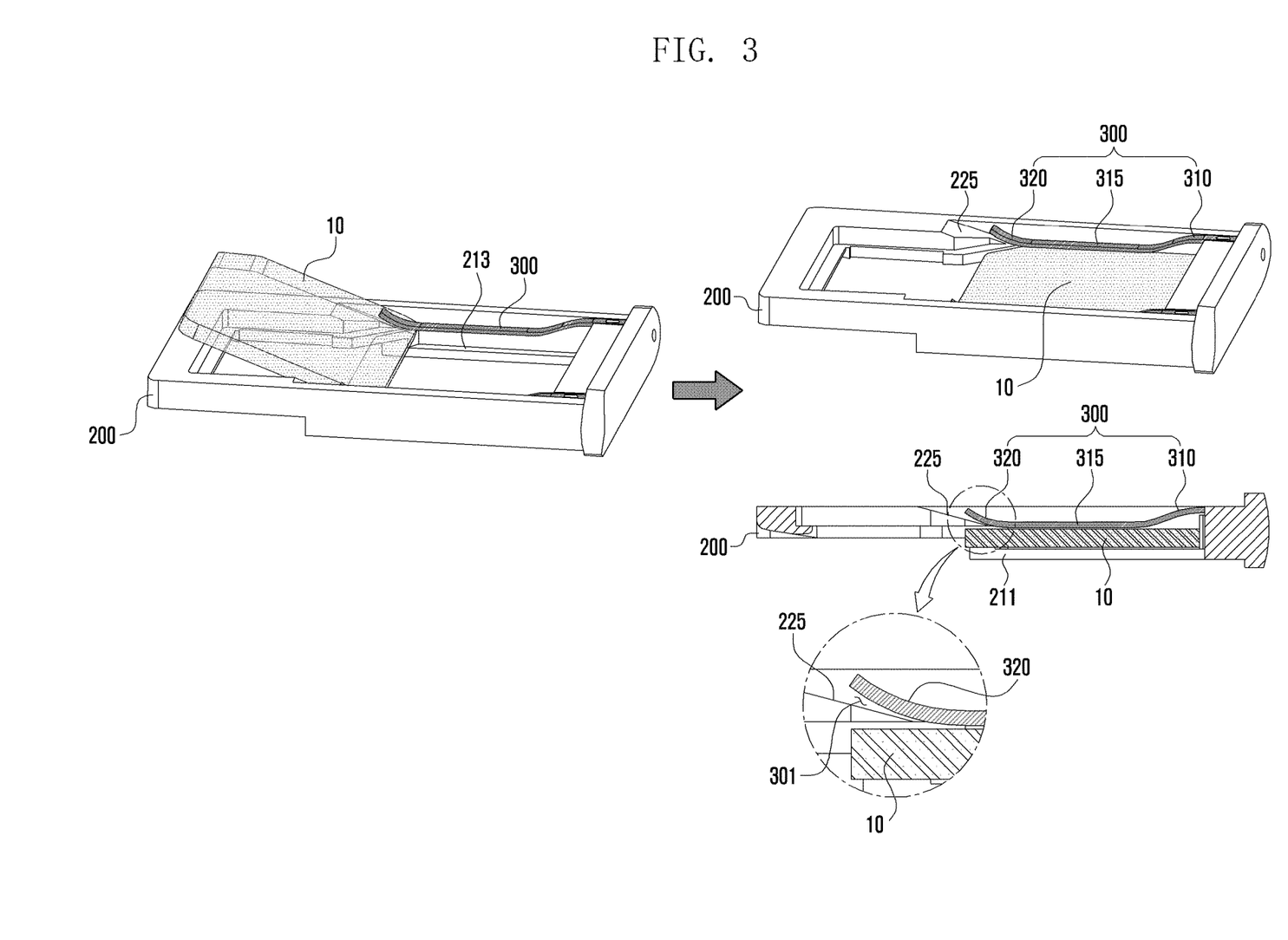
FIGS. 3 and 4 are views illustrating a process of seating a SIM card in a tray in accordance with various embodiment.
Figure 4:
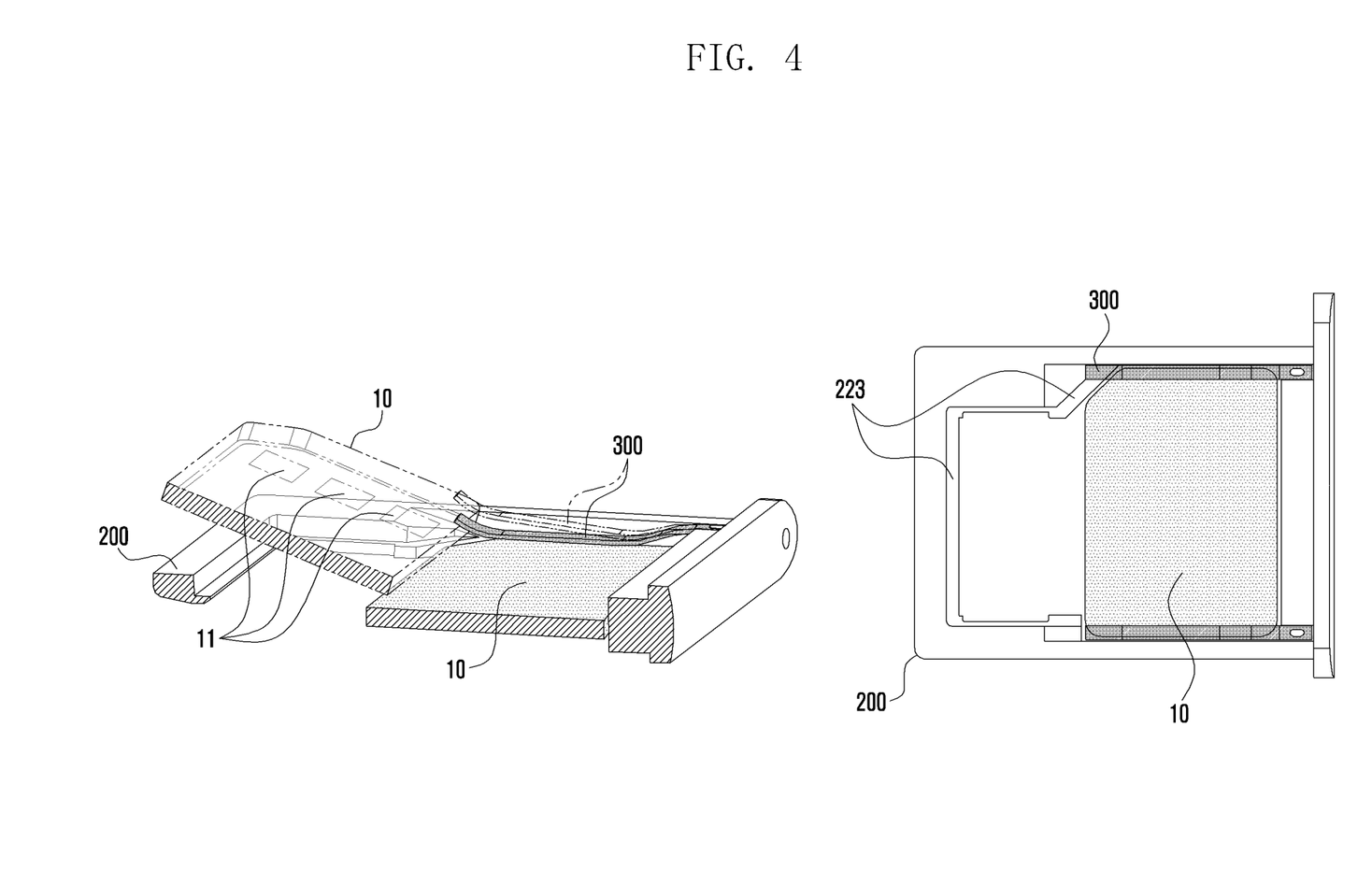

FIGS. 3 and 4 are views illustrating a process of seating a SIM card in a tray in accordance with various embodiments.

As shown in FIGS. 3 and 4, according to various embodiments, a user can put a first end of the SIM card 10 into the gaps 301 between the slopes 225 of the tray 200 and the second sections 320 of the plate springs 300.

Next, when the user pushes a second end of the SIM card 10, the SIM card 10 slides on the slopes 225 and the second sections 320 and the pressing sections 315 of the plate springs 300 are lifted.

Next, the SIM card 10 is seated on the first seats 213 of the tray 200, and the lifted pressing sections 315 of the plate springs 300 can press and fix the top of the SIM card 10 by returning to the initial state. Since the first sections 310 of the plate springs 300 are fixed to the tray 200, the pressing sections 315 of the plate springs 300 can be elastically operated. The SIM card 10 may have a plurality of contact areas 11 on the bottom thereof.

FIGS. 5 and 6 are views illustrating a process of seating an SD card in a tray in accordance with various embodiment.

As shown in FIGS. 5 and 6, according to various embodiments, the SD card 20 can be seated on the second seats 223 of the tray 200. The SD card 20 seated on the second seats 223 can be stacked over the SIM card 10 seated on the first seats 213 of the tray 200. There may be an empty space without any wall between the SIM card 10 and the SD card 20. Accordingly, it is possible to stack the SIM card 10 and the second card 20 in as close contact as with each other as possible. The SD card 20 may have a plurality of contact areas 21 at predetermined positions on the bottom thereof.

As shown in FIG. 6, the SIM card 10 may be larger in width vertically than horizontally. The SD card 20 may be larger in width horizontally than vertically. The SD card 20 can be seated on the second seat 223 without interfering with and facing the plate springs 300 disposed inside the first wall 210 and the second wall 220 of the tray 200.

Figure 7:
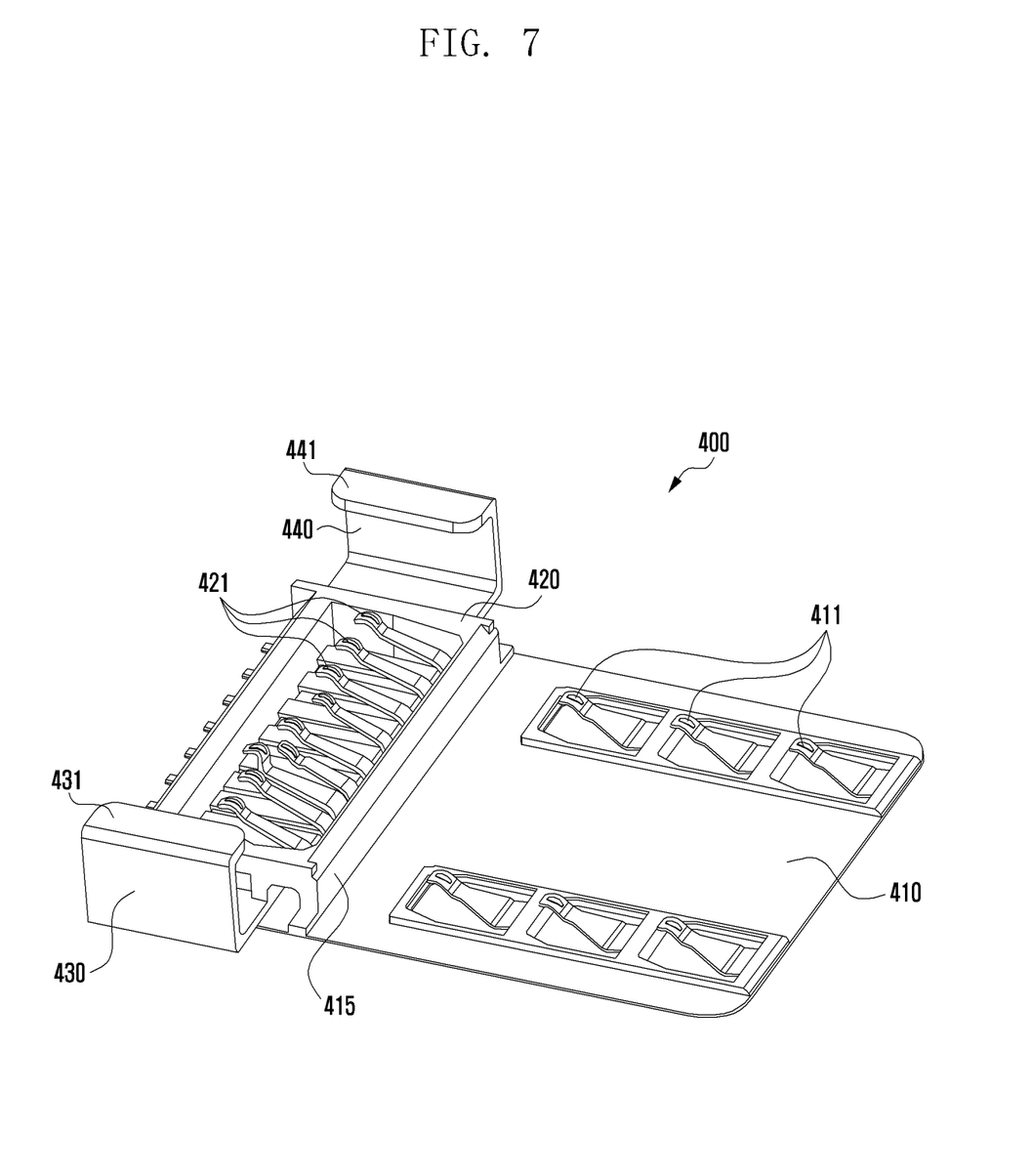
FIG. 7 is a view showing a second connector device according to various embodiments.
Figure 8:
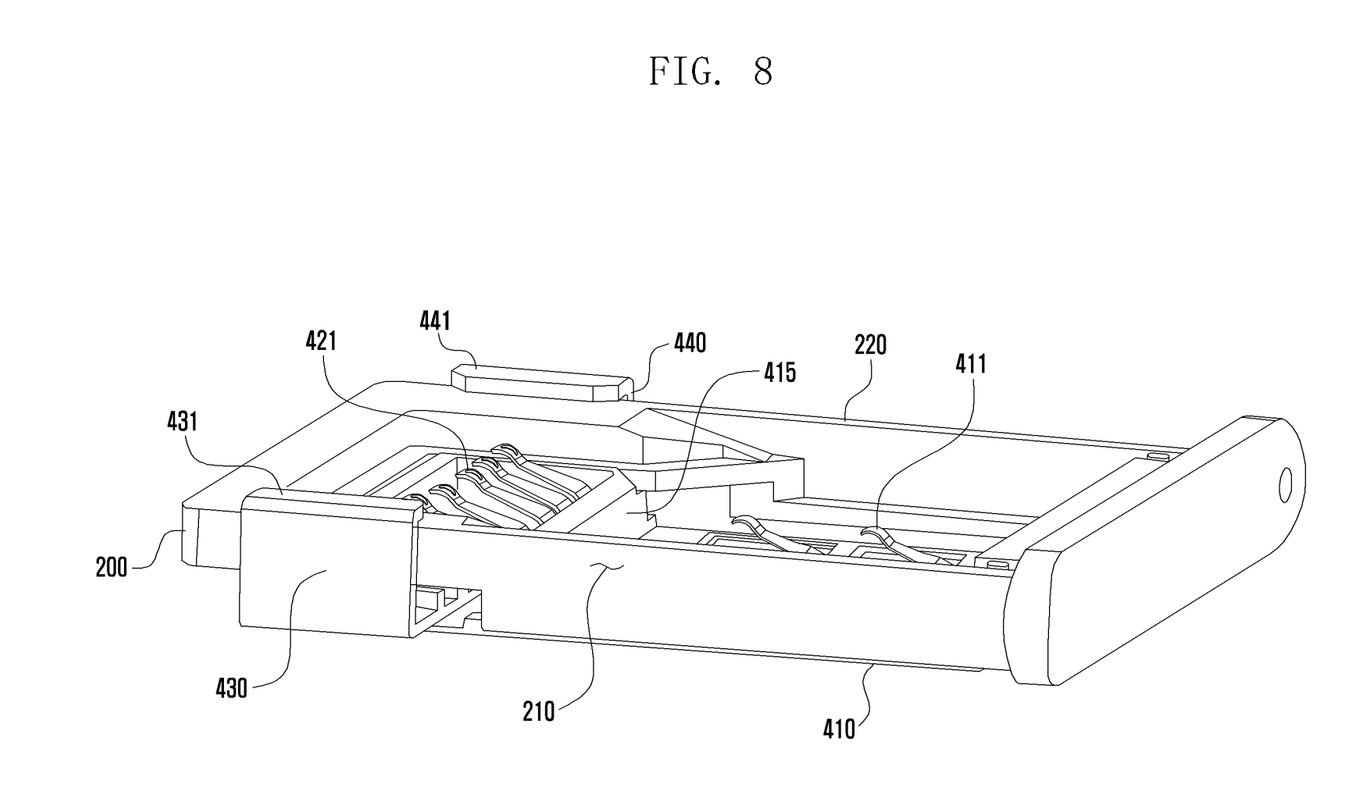
FIGS. 8 and 9 are views showing the state in which the first connector device and the second connector device according to various embodiments have been combined.
Figure 9:
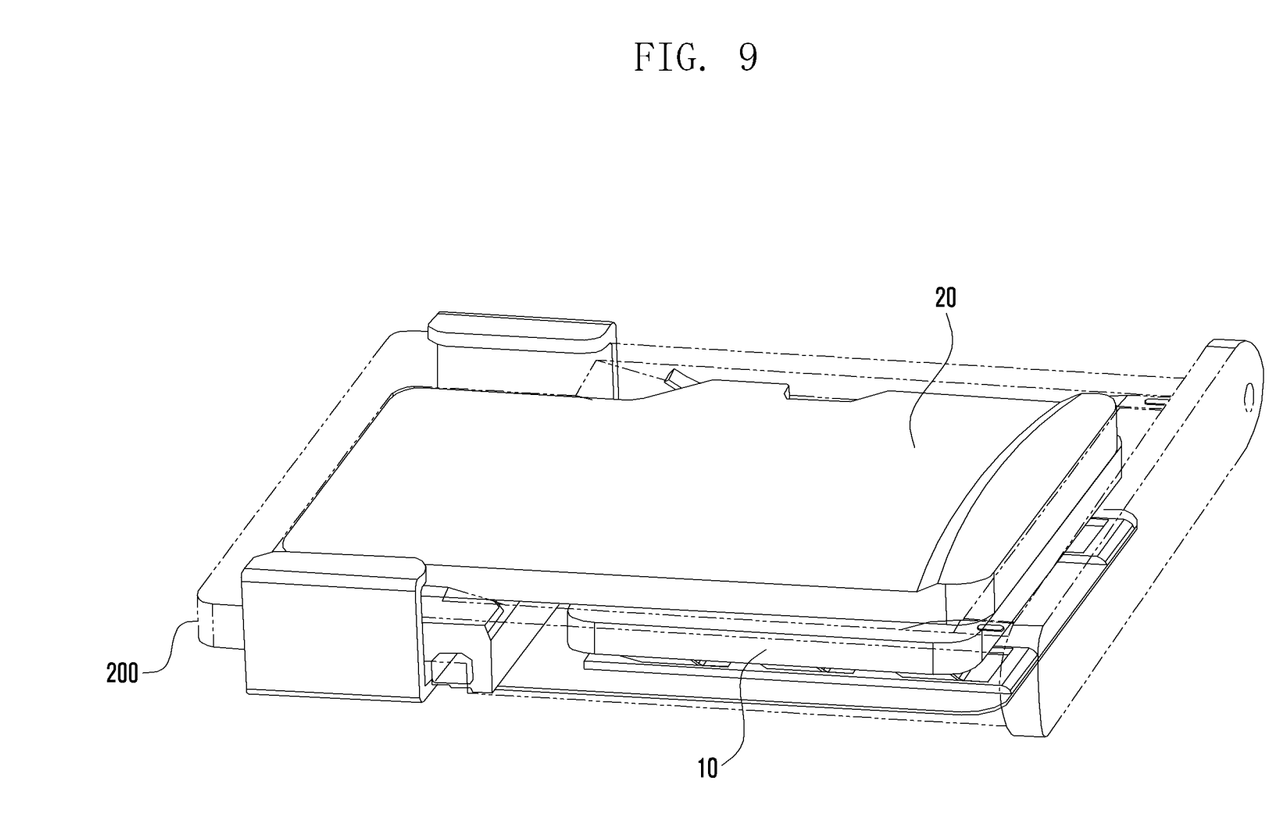

FIG. 7 is a view showing a second connector device according to various embodiments and FIGS. 8 and 9 are views showing the state in which the first connector device and the second connector device according to various embodiments have been combined.

According to various embodiments, a second connector device 400 may be a socket that is disposed in an electronic device such as a mobile phone. The second connector device 400 can be electrically connected with a substrate etc. in an electronic device. The second connector device 400 can receive and seat the first connector device 100 therein.

As shown in FIGS. 7 to 9, the second connector device 400 according to various embodiments may have a first receiving part 410, a second receiving part 420, a first fixing part 430, and a second fixing part 440.

According to various embodiments, the first receiving part 410 and the second receiving part 420 of the second connector device 400 may be formed at different heights due to a step 415 formed between the first receiving part 410 and the second receiving part 420. The first receiving part 410 at a side of the step 415 may be positioned lower than the second step 420 at the other side of the step 415. The first seat 410 can receive the SIM card 10 and the second receiving part 420 can receive the SD card.

According to various embodiments, the first receiving part 410 of the second connector device 400 may have a group of first contact terminals 411 protruding upward at an angle. When the tray 200 of the first connector device 100 is inserted into the second connector device 400 that is a socket, the first contact terminals 411 can come in contact with the contact areas 11 on the bottom of the SIM card 10.

According to various embodiments, the second receiving part 420 of the second connector device 400 may have a group of second contact terminals 421 protruding upward at an angle. When the tray 200 of the first connector device 100 is inserted into the second connector device 400, the second contact terminals 421 can come in contact with the contact areas 21 on the bottom of the SD card 20.

According to various embodiments, in the second connector device 400, the first contact terminals 411 in the first receiving part 410 and the second contact terminals 421 in the second receiving part 420 are fixed at first ends and protruding and inclining upward at second ends. Accordingly, when the first connector device 100 is inserted in the second connector device 100, the first contact terminals 411 and the second contact terminals 421 can push up the SIM card 10 and the SD card 20 respectively stacked thereon.

According to various embodiments, the first fixing part 430 of the second connector device 400 may be formed in a ⊂-shape on a first side of the second receiving part 420. The end of the bottom of the first fixing part 430 is fixed to the first side of the second receiving part 420 and the top of the first fixing part 430 can function as a first rib 431 that fixes the top of the first wall 210 of the tray 200 when the first connector 100 is inserted in the second connector device 400.

According to various embodiments, the second fixing part 440 of the second connector device 400 may be formed in a ⊃-shape on a second side of the second receiving part 420. The end of the bottom of the second fixing part 440 is fixed to the second side of the second receiving part 420 and the top of the second fixing part 440 can function as a second rib 440 that fixes the top of the second wall 220 of the tray 200 when the first connector 100 is inserted in the second connector device 400.

According to various embodiments, the first rib 431 and the second rib 441 respectively formed on the tops of the first fixing part 430 and the second fixing part 440 of the second connector device 400 may further extend inward, whereby it can fix the SD card 20 when the tray 200 is inserted.

Therefore, according to various embodiments, the SIM card 10 and the SD card 20 that are different in size can be individually or simultaneously mounted on one tray 200.

Therefore, other than the embodiments described herein, all of changes or modifications based on the spirit of the disclosure should be construed as being included in the scope of the embodiments of the present disclosure.

The invention claimed is:

1. A connector device having a multi-receiving part, the connector device comprising:
   a tray having an opening therein and having a first wall, a second wall, a third wall, and a fourth wall that are integrally combined to receive a first memory card and/or a second memory card; and
   plate springs disposed respectively inside of the first wall and the second wall of the tray and fixing the first memory card seated in the tray,
   wherein first seats horizontally extending are formed at predetermined positions on inner sides of the first wall and the second wall of the tray to seat the first memory card, and
   second seats horizontally extending are formed at predetermined positions on the inner sides of the first wall, the second wall, and the third wall to seat the second memory card over the first memory card.

2. The connector device of claim 1, wherein the first wall and the second wall face each other and the third wall and the fourth wall face each other.

3. The connector device 1, wherein the fourth wall is a cover of the tray.

4. The connector device of claim 1, wherein a 1-1 extension is formed downward at predetermined positions on the first wall and a 2-1 extension is formed downward at a predetermined position on the second wall.

5. The connector device of claim 4, wherein the first seats are formed at the 1-1 extension and the 2-1 extension.

6. The connector device of claim 1, wherein the first seats and the second seats are formed at different heights due to a step formed at the joint therebetween.

7. The connector device of claim 1, wherein portions, which go to the third wall from a middle point on the tray, of the first wall and the second wall are thicker than portions, which go to the fourth wall from the middle point on the tray, of the first wall and the second wall.

8. The connector device of claim 1, wherein the width between the first wall and the second wall at portions going to the fourth wall from a middle point on the tray is larger than the width at the portions going to the third wall from the middle point on the tray between the first wall and the second wall.

9. The connector device of claim 1, wherein chamfered surfaces corresponding to cut-off portions formed at a portion of the first memory card or the second memory card are at predetermined positions on the second seats formed on the inner sides of the first wall and the second wall.

10. The connector device of claim 1, wherein slopes inclined down toward the first seats are formed at predetermined positions on the first wall and the second wall so that the first memory card can be slid to be seated on the first seats.

11. The connector device of claim 1, wherein the plate springs each have a first section, a pressing section, and a second section that are integrally combined,
   wherein the first sections are fixed at a predetermined position inside the fourth wall of the tray,
   the pressing portions are horizontally formed from predetermined portions of the first sections to press the first memory card seated on the first seats, and
   the second sections are inclined upward around the slopes formed on top of middle portions of the first wall and the second wall of the tray.

12. The connector device of claim 11, wherein the angles of the second sections of the plate springs is larger than the angles of the slopes, so gaps are formed between the second sections and the slopes.

13. The connector device of claim 1, wherein the first memory card is larger in width vertically than horizontally, the second memory card is larger in width horizontally than vertically, and the second memory card is seated on the second seats without facing the plate springs.

14. The connector device of claim 1, wherein the tray is inserted into and drawn out of a socket in an electronic device.

15. An electronic device comprising the connector device of claim 1.

* * * * *